United States Patent [19]

Miller

[11] 4,175,773
[45] Nov. 27, 1979

[54] PASSIVE SEAT BELT SYSTEM

[75] Inventor: Larry D. Miller, Warren, Mich.

[73] Assignee: General Motors Corporation, Detroit, Mich.

[21] Appl. No.: 922,998

[22] Filed: Jul. 10, 1978

[51] Int. Cl.² ............................................. B60R 21/10
[52] U.S. Cl. .................................. 280/803; 280/808
[58] Field of Search ................ 280/745, 747; 297/388, 297/389

[56] References Cited

U.S. PATENT DOCUMENTS

| 3,679,229 | 7/1972 | Westrate | 280/745 |
| 3,770,294 | 11/1973 | Hammer | 280/745 |
| 3,833,239 | 9/1974 | Coenen | 280/745 |
| 4,138,142 | 2/1979 | Wize | 280/745 |

FOREIGN PATENT DOCUMENTS 1125232  8/1968  United Kingdom ..................... 280/745

OTHER PUBLICATIONS

"Belt Patent Donated," Automotive News, Jan. 4, 1971, p. 29.

Primary Examiner—David M. Mitchell
Attorney, Agent, or Firm—Charles E. Leahy

[57] ABSTRACT

A passive three-point lap and shoulder belt system includes a continuous loop of belt which is slidably mounted on the door adjacent the occupant's shoulder by a slide loop or pulley and has both ends mounted on the body inboard the occupant seat to define a double strand diagonal shoulder belt. A retractor provides the mounting of one of the shoulder belt ends to the vehicle body so that the shoulder belt is extended from the retractor and through the slide loop upon opening movement of the door and is retracted upon closing movement of the door. The lap belt has one end attached to the vehicle door generally adjacent the hip of the occupant and the other end attached on the shoulder belt strand mounted by the retractor and at a point thereon which travels from inboard the occupant when the door is closed to a position intermediate the retractor and the door mounted slide loop upon opening movement of the door. Each increment of door opening movement causes the shoulder belt to be unwound from the retractor by a distance equal to twice the increase in distance between the retractor and the door mounted slide loop so that the lap belt inboard end is lifted upwardly and moved laterally outwardly of the occupant to facilitate occupant ingress and egress.

3 Claims, 4 Drawing Figures

PASSIVE SEAT BELT SYSTEM

The invention relates to a passive three-point lap and shoulder belt system for restraint of a seated vehicle occupant.

BACKGROUND OF THE INVENTION

It is well known in motor vehicles to restrain an occupant in the seat by a lap belt disposed across the lap and a shoulder belt disposed diagonally across the chest. It is also well known to mount the outboard lap and shoulder belt ends on the door and mount the inboard belt ends on the vehicle body by retractors so that the swing geometry of the door automatically moves the belts between a restraining position about the occupant and a stowed position forwardly of the occupant in response to opening movement of the door. Furthermore, it is known to provide a single retractor mounting the inboard end of the shoulder belt on the body and to attach the inboard end of the lap belt on the shoulder belt so that unwinding of the shoulder belt from the retractor carries the lap belt end outwardly of the seated occupant to facilitate occupant ingress and egress. In the aforedescribed system, each increment of increased distance between the inboard retractor and the outboard mounted shoulder belt end causes an equal increment of laterally outward movement of the inboard lap belt end relative the occupant seat while the lateral distance between the door and the inboard lap belt end remain unchanged. It would be desirable to further facilitate occupant ingress and egress by moving the inboard lap belt end closer adjacent the door as well as outwardly of the occupant during door opening movement.

SUMMARY OF THE INVENTION

The present invention provides a new and improved lap and shoulder belt system wherein the lap belt inboard end is attached to a double strand shoulder belt and is moved toward the door mounted shoulder belt anchorage upon opening movement of the door.

According to the present invention, a passive three-point lap and shoulder belt system includes a double strand continuous loop shoulder belt which is slidably mounted on the door adjacent the occupant's shoulder by a slide loop or pulley and has both the ends mounted on the vehicle body inboard the occupant seat. A retractor provides the mounting of at least one of the shoulder belt ends on the vehicle body so that the shoulder belt is extended from the retractor and through the slide loop upon opening movement of the door and retracted upon closing movement of the door. The lap belt has one end attached to the vehicle door generally adjacent the hip of the occupant and the other end attached to the shoulder belt strand mounted by the retractor and at a point thereon which travels from inboard the occupant when the door is closed to a position intermediate the retractor and the door mounted slide loop upon opening movement of the door. Each increment of door opening movement causes the shoulder belt to be unwound from the retractor by a distance equal to twice the increase in distance between the retractor and the door mounted slide loop so that the lap belt inboard end is lifted upwardly and moved laterally outwardly of the occupant to facilitate occupant ingress and egress.

According to a modification of the invention, a retractor may be provided at the attachment of the lap belt to the door to fit the lap belt to the particular occupant. The shoulder belt may have a retractor mounting both of the strands inboard the occupant. The retractor winding the strand which has the lap belt attached thereto has a windup effort greater than the other retractor so that the prevailing direction of belt windup when the door is closed is in the direction to maintain the lap belt inboard end at the restraining position. The retractor having the lesser windup effort for winding the other belt strand includes a door actuated locking mechanism effective to lock the retractor against belt unwinding rotation at all times except when the door is closed to assure that the strand having the lap belt attached is extended from its retractor upon door movement and the other strand is freed for winding and unwinding to adjust the shoulder belt to fit the particular occupant when the belt is in the restraining position.

BRIEF DESCRIPTION OF THE DRAWINGS

These and other objects, features and advantages of the invention will become apparent upon consideration of the specification and the appended drawings in which.

DESCRIPTION OF THE PREFERRED EMBODIMENT

Figure 1:
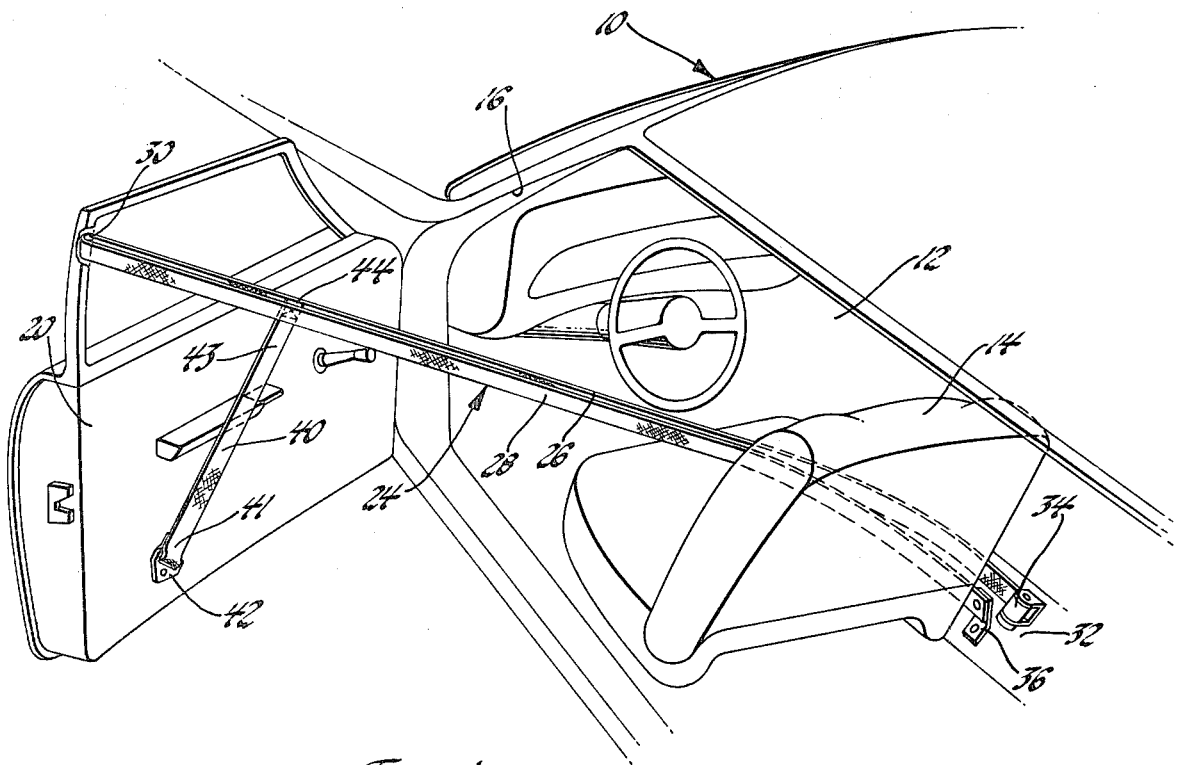
FIG. 1 is a perspective view of a motor vehicle body having a belt arrangement according to the invention with the door open and the lap belt and shoulder belts shown in the stowed occupant access position.

Referring to FIG. 1, a vehicle body generally indicated at 10 defines a passenger compartment 12 in which an occupant seat 14 is provided for seating an occupant. The vehicle body has a door opening 16 which is selectively closed by a door 20 having its forward end pivoted to the vehicle body.

The shoulder belt, generally indicated at 24, includes a continuous loop of belt defining strands 26 and 28 which extend slidably through a slide loop or pulley 30 mounted on the upper rear corner of the door 20 generally adjacent the shoulder of the occupant. A retractor 34 mounts the inboard end of the shoulder belt strand 26 on the drive line tunnel 32 of the vehicle body 10 generally adjacent the hip of the seated occupant. An anchor bracket 36 mounts the end of the strand 28 on the tunnel 32. Accordingly, as the door is moved from the FIG. 1 open position to the FIG. 2 closed position, the strand 26 is wound upon the retractor 34 and in turn retracts the strand 28 through the slide loop 30. The retractor 34 has an inertia locking mechanism or the like associated therewith to prevent unwinding of the shoulder belt strand 26 during emergency conditions so that the occupant is restrained in the seat.

Figure 2:
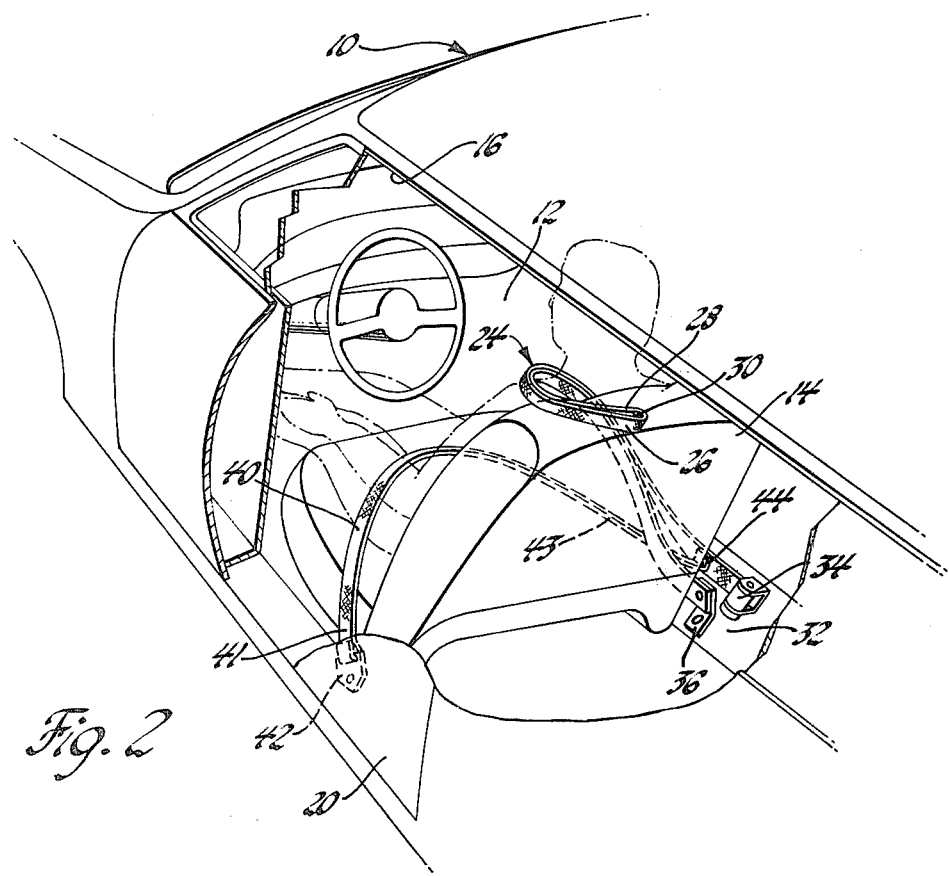
FIG. 2 is a view similar to FIG. 1 but showing the door closed and the belts in the occupant restraining position.

The lap belt, generally indicated at 40, has an outboard end 41 attached to the door 20 by an anchor bracket 42 and an inboard end 43 which is sewn or otherwise suitably attached to the shoulder belt strand 26 at a point 44 which is positioned adjacent the inboard occupant hip when the door is in the closed position of FIG. 2. When the door is opened, the outward swinging movement of the slide loop 30 causes belt to be extended from the retractor 34 so that the point 44 of strand 26 travels outwardly of the passenger compartment to carry the lap belt inboard end 43 away from the occupant. Since the strand 26 is extended from retractor 34 increments of length equal to twice the increase in distance between the retractor 34 and the door mounted slide loop 30, the lap belt 40 is moved outwardly and upwardly relative the occupant seat and closer adjacent the door. When the door is closed, the strand 26 is rewound upon the retractor 34 and moves the inboard end 43 of the lap belt 40 to the FIG. 2 position wherein the lap belt 40 is again disposed in the restraining position across the lap of the occupant.

Figure 3:
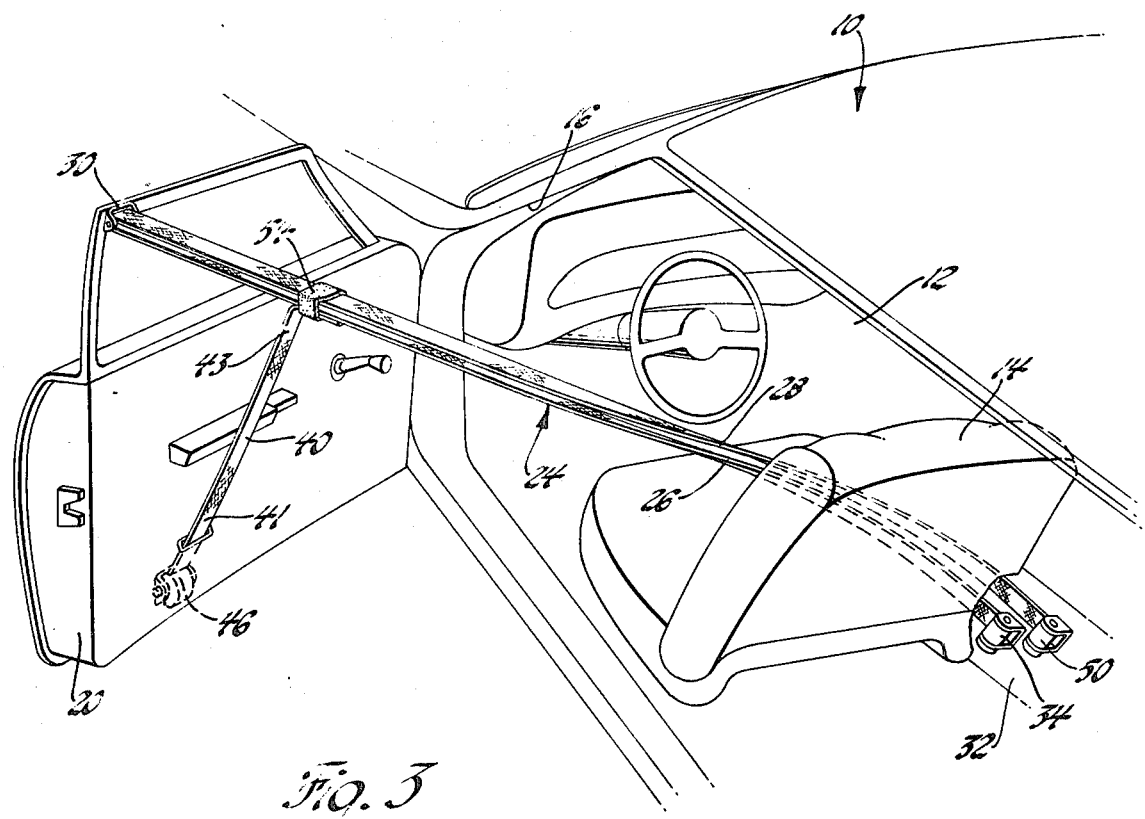
FIG. 3 is a view similar to FIG. 1 showing another seat belt system embodying the invention.

Referring to FIG. 3, there is shown a modification of the invention wherein like elements are identified by like numerals. The outboard end 41 of the lap belt 40 is attached to the door 20 by a retractor 46 which has a relatively low effort windup spring associated therewith to permit winding and unwinding of the lap belt 40 to fit the size of the particular seated occupant without distorting the straight-line path of the shoulder belt strand 26 between the retractor 34 and the slide loop 30. The seat belt system of FIG. 3 also includes a retractor 50 associated with the shoulder belt strand 28. The effort of the windup spring associated with the retractor 50 is lower than the windup effort of the retractor 34 so that the prevailing direction of belt windup will be to shorten the strand 26 and thereby draw the inboard end 43 of the lap belt 40 to its restraining position adjacent the retractor 34. The lower effort windup spring of retractor 50 winds and unwinds the strand 28 to adjust the length of the shoulder belt strands 26 and 28 to suit the size of the particular seated occupant and to permit forward leaning movement of the upper torso without disturbing the position of the lap belt 40.

Each of the retractors 34, 46 and 50 have an associated vehicle sensitive inertia locking mechanism or the like for locking the retractor upon occurrence of an emergency condition. Furthermore, the retractor 50 has an auxiliary locking mechanism which is effective to lock the retractor 50 against belt unwinding rotation at all times except when the door is closed. Accordingly, during opening movement of the door, the inboard end of the shoulder belt strand 28 is fixed against extension so that opening movement of the door causes strand 26 to be unwound from retractor 34 and the inboard end of the lap belt 40 is moved to the stowed position. The auxiliary locking of the retractor 50 may be accomplished by a solenoid operated by the door jamb switch or by a bowden wire or the like extending between the door and the lock pawl of the retractor.

Figure 4:
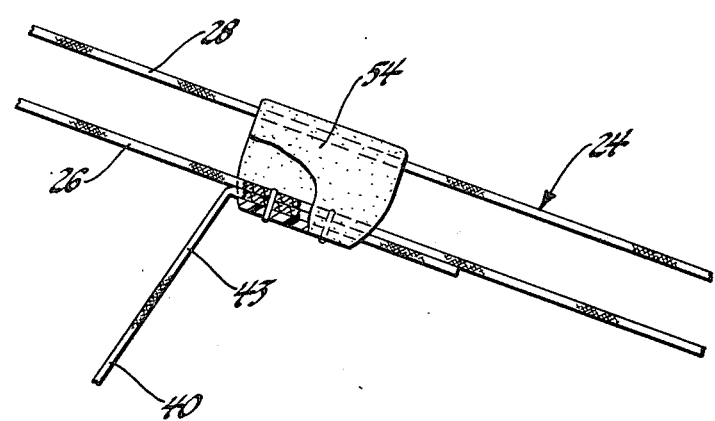
FIG. 4 is an enlarged fragmentary view of FIG. 3 showing the preferred attachment of the lap belt to the shoulder belt.

Referring to FIG. 4, there is shown a connecting member 54 which is preferably of injection molded plastic and encircles the belt strands 26 and 28. The connecting member 54 is suitably attached to the strand 26, for example, by being sewn or riveted thereto, and slidably engages the strand 28. Connecting member 54 permits movement of the strand 28 relative the strand 26 but holds the strands in closely adjacent parallel overlying relationship so that the visual presence of the shoulder belt strands 26 and 28 is minimized.

In the system of FIG. 3, the positions of the shoulder belt strands 26 and 28 are reversed, i.e., in FIG. 1 the strand 28 is closest the occupant whereas in FIG. 3 the strand 26 is closest the occupant. Furthermore, in comparing FIGS. 1 and 3, it will be noted that the mounting orientation of the pulley 30 as well as the various retractors may be varied between the horizontal and vertical attitudes.

Thus, it is seen that the invention provides a new and improved three-point lap and shoulder belt system wherein a continuous loop double strand shoulder belt has the lap belt attached thereto and is unwound from an inboard mounted retractor at increments of length equal to twice the incremental increase in distance between the retractor and a door mounted anchor loop during opening movement of the door so that the lap belt is lifted substantially off the occupant and stowed generally adjacent the door to facilitate occupant ingress and egress.

The embodiments of the invention in which an exclusive property or privilege is claimed are defined as follows:

1. In combination with a vehicle body defining an occupant compartment in which an occupant seat is accessible through a door opening selectively opened and closed by a movable door, a passive occupant restraining belt arrangement comprising:

a shoulder belt having first and second ends;

a shoulder belt anchor mounted on the door generally adjacent the shoulder of the occupant and slidably receiving the shoulder belt intermediate the first and second ends thereof;

means attaching the first end of the shoulder belt inboard the occupant and generally adjacent the occupant hip;

retracting means mounted on the vehicle body inboard and generally adjacent the hip of the occupant and having the second end of the shoulder belt attached thereto for extending the second end of the shoulder belt upon outward opening movement of the door and sliding movement of the shoulder belt through the door mounted shoulder belt anchor;

a lap belt having first and second ends;

means attaching the first end of the lap belt on the vehicle door generally adjacent the hip of the occupant;

and means attaching the second end of the lap belt to the shoulder belt at a point thereon traveling from inboard the occupant adjacent the hip when the door is closed to a position intermediate the retracting means and the door mounted anchor loop upon opening movement of the door whereby the lap belt is moved from the normal door closed restraining position to a nonrestraining position when the door is open.

2. In combination with a vehicle body defining an occupant compartment in which an occupant seat is accessible through a door opening selectively opened and closed by a swingingly movable door, a passive occupant restraining belt arrangement comprising:

a shoulder belt having first and second ends;

means attaching the first end of the shoulder belt inboard the occupant and generally adjacent the occupant hip;

retracting means mounted on the vehicle body inboard and generally adjacent the hip of the occupant and having the second end of the shoulder belt attached thereto for extending and retracting the shoulder belt;

a shoulder belt anchor mounted on the door generally adjacent the shoulder of the occupant and slidably receiving the shoulder belt intermediate the first and second ends thereof to define first and second overlying parallel belt strands disposed diagonally across the chest of the occupant so that the strand extending between the retracting means and the anchor loop is extended from the retracting means in increments of length equal to twice the incremental increase in distance between the retracting means and the door mounted anchor loop during movement of the door from the closed position to the open position where the swing geometry of the door locates the shoulder belt forwardly of the seat to permit occupant ingress and egress;

a lap belt having first and second ends;

means attaching the first end of the lap belt on the vehicle door generally adjacent the hip of the occupant;

and means attaching the second end of the lap belt to the shoulder belt strand extending between the retracting means and the anchor loop at a point thereon positioned adjacent the occupant hip when the door is closed to a position intermediate the retracting means and the door mounted anchor loop upon opening movement of the door to permit occupant ingress and egress.

3. In combination with a vehicle body defining an occupant compartment in which an occupant seat is accessible through a door opening selectively opened and closed by a swingingly movable door, a passive occupant restraining belt arrangement comprising:

a shoulder belt having first and second ends;

first and second retracting means mounted on the vehicle body inboard and generally adjacent the hip of the occupant for respectively mounting the first and second shoulder belt ends;

a shoulder belt anchor mounted on the door generally adjacent the shoulder of the occupant and slidably receiving the shoulder belt intermediate the first and second ends thereof to define first and second overlying parallel belt strands disposed diagonally across the chest of the occupant and respectively extended and retracted by the first and second retracting means;

a lap belt having an inboard end and an outboard end;

means attaching the outboard end of the lap belt on the vehicle door generally adjacent the hip of the occupant;

and means attaching the inboard end of the lap belt to the first strand;

said first retracting means having a belt retracting effort greater than the retracting effort of the second retracting means so that the prevailing direction of shoulder belt retraction is to retract the first strand so that the lap belt inboard end is positioned adjacent the occupant hip when the door is closed to restrain the occupant and so that forward leaning movement of the occupant extends the second from the second retracting means;

and locking means associated with the second retracting means to prevent extension of the second strand therefrom whenever the door is being opened so that the first strand is extended from the first retracting means to carry the inboard end of the lap belt toward the door mounted anchor loop upon door opening movement to facilitate occupant ingress and egress.

* * * * *